June 20, 1933. A. J. DOERMANN

PROCESS OF MAKING ABRASIVE DISKS

Re. 18,872

Original Filed Aug. 12, 1927

Inventor:
Albert J. Doermann,
By Dyrenforth, Lee, Christian & Hits,
Att'ys.

Reissued June 20, 1933

Re. 18,872

UNITED STATES PATENT OFFICE

ALBERT J. DOERMANN, OF CHICAGO, ILLINOIS

PROCESS OF MAKING ABRASIVE DISKS

Original No. 1,785,437, dated December 16, 1930, Serial No. 212,550, filed August 12, 1927. Application for reissue filed December 14, 1932. Serial No. 647,229.

This invention relates to improvements in the process of making abrasive disks, and more especially such disks composed of powdered abrasive and cement. For example, the abrasive may consist of ground or powdered carborundum, emery, flint or any similar suitable substance and be bound together by any suitable cement such as, for example, heat-hardenable resin.

Heretofore in manufacturing abrasive disks of this type difficulty has been encountered in obtaining a firm union between the particles of abrasive and the cement. By the use of my invention I produce a disk with a uniformly agglomerated mixture without any relatively hard or soft spots in the finished material.

Another feature of my invention is the provision of means for fastening a backing on the disk.

Other features and advantages of my invention will appear more fully as I proceed with my specification.

Figure 1:
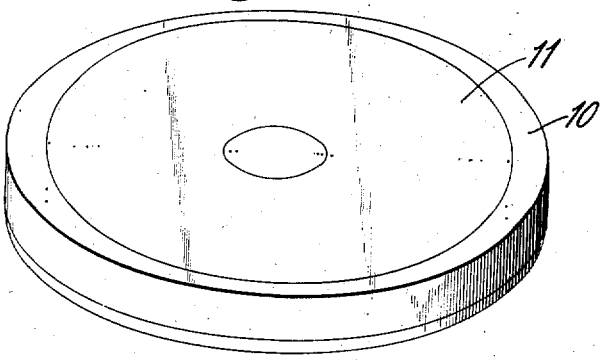
Figure 2:
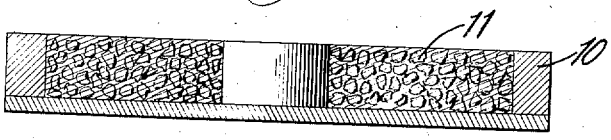
Figure 3:
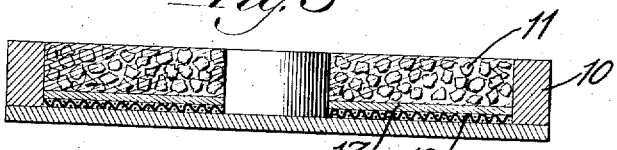
Figure 4:
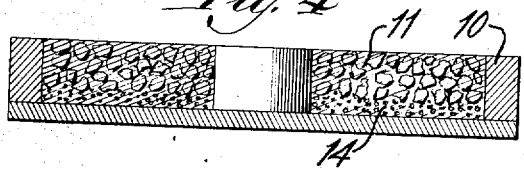
Figure 4A:
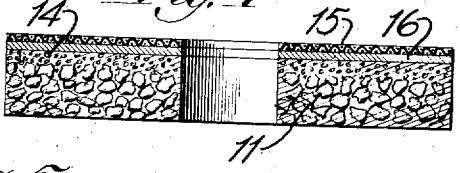
Figure 5:
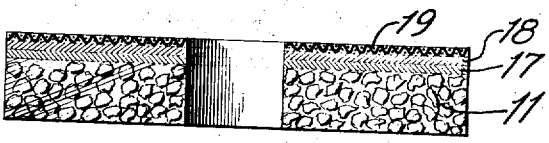

In the drawing accompanying this application, Figure 1 is a view in perspective of a mold showing a disk cast or molded therein, Fig. 2 is a vertical sectional view of the device shown in Fig. 1, Fig. 3 is a view similar to Fig. 2 showing a method of applying the backing to the disk, Fig. 4 is a view similar to Fig. 2 showing a method of producing on the back of the disk a relatively smooth, hard surface for the purpose of applying a backing thereto, Fig. 4[a] is a view showing the method of applying the backing to the disk of Fig. 4, Fig. 5 is a view similar to Fig. 4[a] showing another method of applying a backing to the disk.

In the practice of my invention, I take suitable proportions of abrasive and cement. For example, I may use ten pounds of abrasive to from sixteen to twenty-six ounces of heat-hardenable resin. The resin is preferably finely powdered before being melted.

In the practice of my invention I first take the proper amount of powdered abrasive and treat the same with a suitable hard drying oil, for example, Chinawood or tung oil, coating the abrasive grains in this manner assists in causing the cement to adhere to the same. By regulating the amount of oil used a difference in hardness of the completed disk also may be procured.

After the grains of abrasive have thus been coated with hard drying oil to the proper extent, the proper amount of powdered heat hardenable resin with other cement is added and the same thoroughly mixed.

I have found that the use of a hard drying oil such as a Chinawood or tung oil is far superior to coatings such as creosote which has heretofore been employed.

After the coating of the abrasive with the oil and the addition of the heat-hardenable resin and the mixing, the mixture is ready to be placed in a form for forming the disk. This is shown in Figs. 1 and 2, where 10 indicates the mold and 11 the mixture of abrasive and cement. After the mixture is spread evenly in the mold the same may be ironed in with an ordinary plasterer's trowel and then struck off with an ordinary slicing bar and is then ready for the oven.

The material is then placed in an oven and baked at a proper temperature, in the usual manner, for a sufficient length of time, as is well known in the art, preferably without the use of any pressure.

I shall now describe the different methods for placing a backing on the disk. Such a backing, it is to be understood, may be made either of cloth, paper, metal, or any other suitable material and may be either a plain sheet, perforated, or woven metal, depending upon the use for which the disk is intended.

In Fig. 3 I have shown a method of placing on the disk a backing at the same time that the disk is molded. As here shown, the backing must be some non-combustible material, for example woven asbestos fabric. A sheet of this material as indicated by 12 is first placed in the mold 10 and then a thin layer 13 of powdered resin dusted on. The mixture of abrasive and cement as indicated by 11 is then placed on top. The whole is then baked in the usual manner and the baking causes the backing 12 to adhere firmly to the disk.

In the method shown in Figs. 4 and 4[a], there is first placed in the mold 10 a layer 14 of very fine abrasive mixed with resin. A mixture of abrasive and cement is then placed on top. The whole is then baked.

When the disk is removed from the mold it will be seen that the layer 14 forms on the back a very smooth, hard surface especially adapted for receiving a backing. A backing of any suitable material as indicated by 15 in Fig. 4[a] may then be cemented on to the smooth surface 14 by means of a layer of suitable cement 16 which, may be, for example, air drying cement such as silicate of soda or any mixture of magnesium oxide and magnesium chloride. If desired, the cement 14 may be heat-hardenable cement and in such case the disk and backing will have to be baked again to make the backing adhere. In such case, of course, the backing 15 must be some non-combustible material.

In Fig. 5 I have shown another method of fastening a backing to the disk 11. In the practice of this method, the disk is formed as shown in Figs. 1 and 2. One surface of the disk is then coated with any hard cement, air drying filler, such as, for example, iron cement as indicated by 17. This gives a very smooth surface to one side of the disk. On top of this smooth surface there is then applied a layer 18 of cement which may be, for example, any air drying cement such as silicate of soda or a mixture of magnesium oxide and magnesium chloride. The backing 19 is then placed on and held on the disk by means of the layer of cement 18. If desired, the layer of cement 18 may be a heat-hardenable resin cement which requires baking, and if such, of course, the backing 19 must be some non-combustible material.

Another advantage in the use of Chinawood or tung oil over creosote is that the former gives off no obnoxious fumes, and also dries harder than creosote.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

I claim:

1. The process of making an abrasive disk comprising, mixing powdered abrasive and heat-hardenable cement, placing the same in a mold with a layer of finely powdered abrasive on the bottom, and making the same.

2. The process of making an abrasive disk consisting of treating powdered abrasive with Chinawood oil to wet the grains, mixing powdered Bakelite resin cement with the wet grains of abrasive to cause the same to become coated with grains of cement adhering to the wet surface of the grains of abrasive and baking the mixture.

3. An abrasive disk comprising a main body of relatively coarse abrasive granules bonded with heat-hardenable cement, and a face or surface of relatively finely powdered abrasive.

4. An abrasive disk comprising abrasive granules and a heat-hardened resin bond, one surface of said disk being coated with finely powdered abrasive and being relatively impermeable.

5. A bonded abrasive article comprising abrasive granules coated with hardened drying oil and bonded with a heat-hardened resin.

6. A bonded abrasive article comprising abrasive granules coated with a hardened Chinawood oil and bonded with a heat-hardened resin.

7. A composite abrasive article comprising an abrasive body adapted for grinding on one of its plane surfaces and a backing attached to the surface which is opposite the grinding face by a cement, said abrasive body consisting of a permeable abrading portion of abrasive particles bonded with a heat-hardened resin and a substantially impermeable surface layer adjacent to the backing, said surface layer being capable of preventing a material penetration of the main portion of the body by the cement.

8. A composite abrasive article comprising an abrasive body adapted for grinding on one of its plane surfaces and a backing cemented to the surface which is opposite the grinding face, said abrasive body consisting of a permeable abrading portion of abrasive particles bonded with a heat-hardened resin and a substantially impermeable surface layer adjacent to the backing.

In testimony whereof, I affix my signature.

ALBERT J. DOERMANN.